United States Patent

Semler

[11] Patent Number: 5,117,573
[45] Date of Patent: Jun. 2, 1992

[54] FISHING LURE

[76] Inventor: Harold F. Semler, R.R. 5, Box 178, Iowa City, Iowa 52240

[21] Appl. No.: 668,044

[22] Filed: Mar. 12, 1991

[51] Int. Cl.$^5$ ............................................. A01K 85/00
[52] U.S. Cl. .................. 43/42.28; 43/42.39; 43/42.09
[58] Field of Search ................ 43/42.28, 42.39, 42.37, 43/42.09, 42.05, 42.24, 42.13, 42.31

[56] References Cited

U.S. PATENT DOCUMENTS

| | | | |
|---|---|---|---|
| 2,161,094 | 6/1939 | Saunders | 43/42.39 |
| 2,365,502 | 12/1944 | Weesner | 43/42.28 |
| 3,021,632 | 2/1962 | Gombar | 43/42.28 |
| 3,740,889 | 6/1973 | Scott | 43/42.28 |
| 4,329,804 | 5/1982 | Brown | 43/42.09 |
| 4,712,325 | 12/1987 | Smith | 43/42.28 |
| 4,862,629 | 9/1989 | Ryan | 43/42.39 |
| 4,908,975 | 3/1990 | Root | 43/42.39 |

Primary Examiner—Kurt Rowan
Attorney, Agent, or Firm—Leon Gilden

[57] ABSTRACT

A fishing lure is provided, including a central shank with a hook member mounted at a lower terminal end of the shank and a support head at an upper terminal end of the shank, with a projection mounted to the support head, including an aperture for receiving fishing line therethrough. The organization includes a plurality of tinsel strands mounted in surrounding relationship about the central shank adjacent the support head extending in a surrounding relationship about the central shank and hook member to effect masking of the hook member. A modification of the invention includes a securement strand secured to a supporting web mounting the tinsel strands thereon for enhanced securement of the supporting web about the support shank. A plurality of such securement strands may be provided for projecting orthogonally relative to the support shank to enhance movement of the lure during a fishing procedure. A further modification of the support strands may further include a plurality of weighted wire members of varying lengths mounted upon the support strands and removably and adherably mounted upon at least one of the strands to permit selective modification of gyration of the lure when used in a fishing procedure.

4 Claims, 5 Drawing Sheets

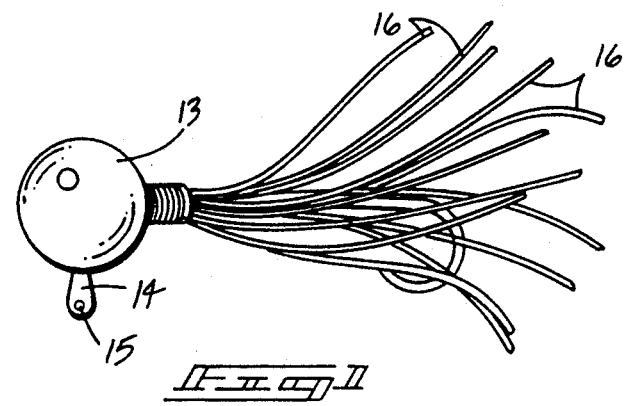
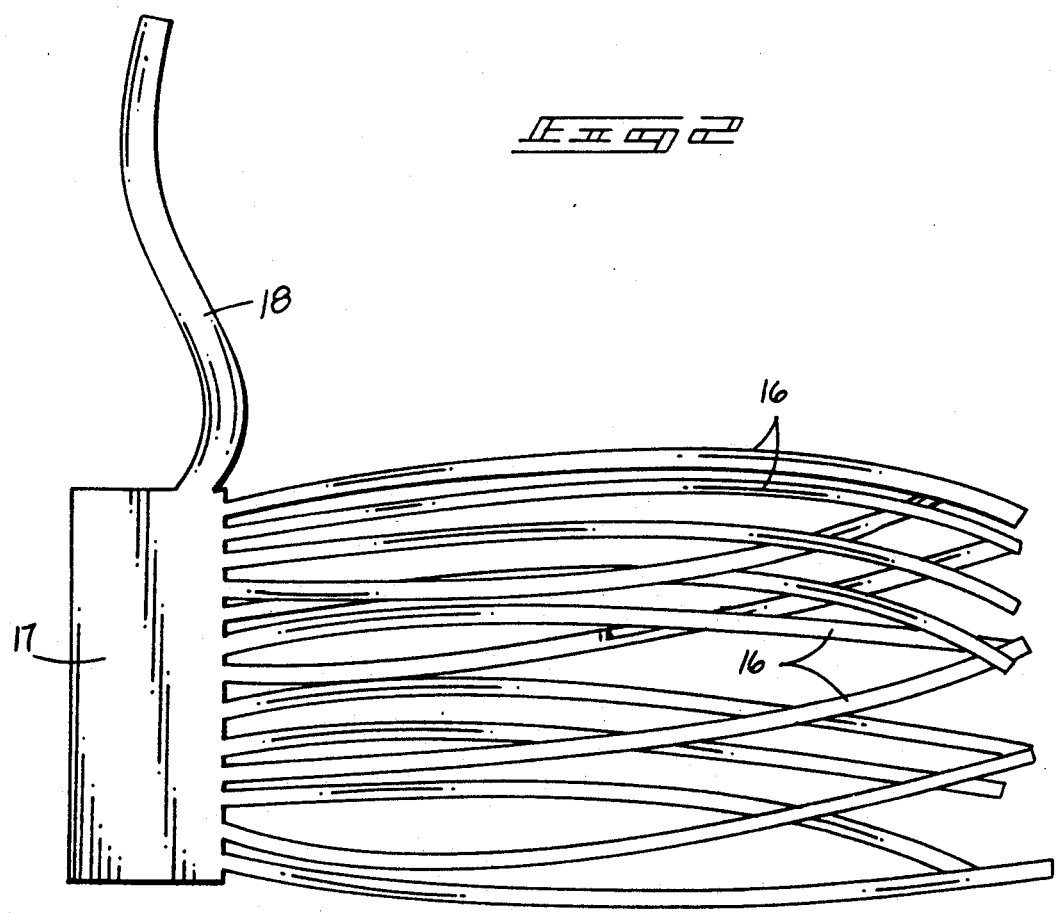

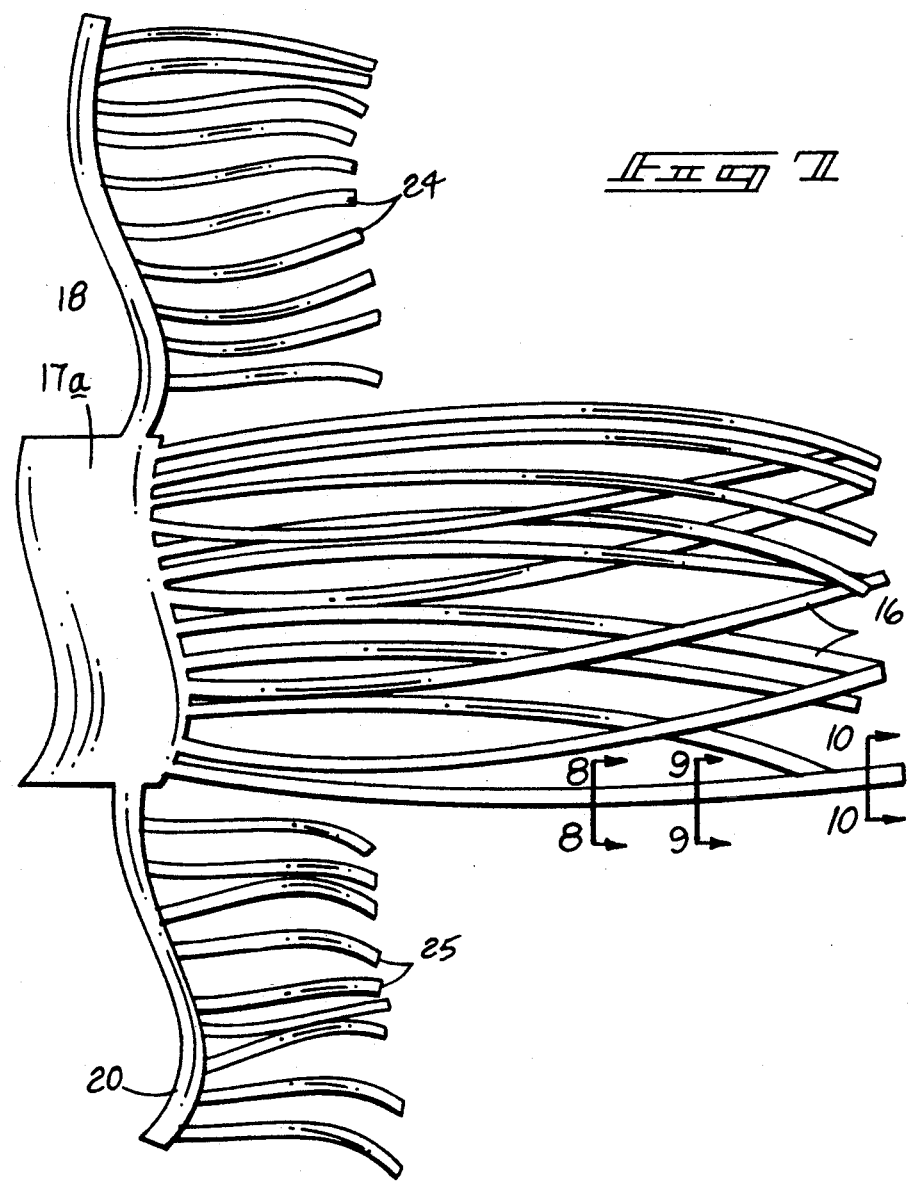
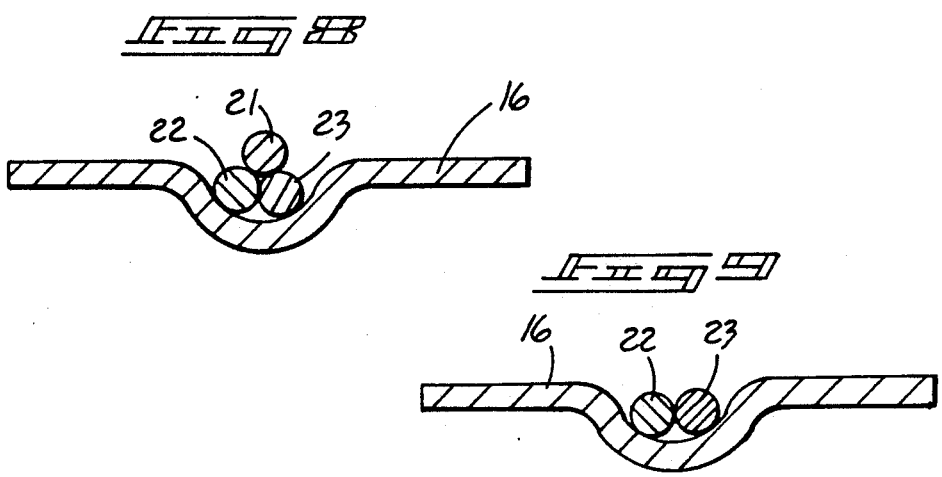

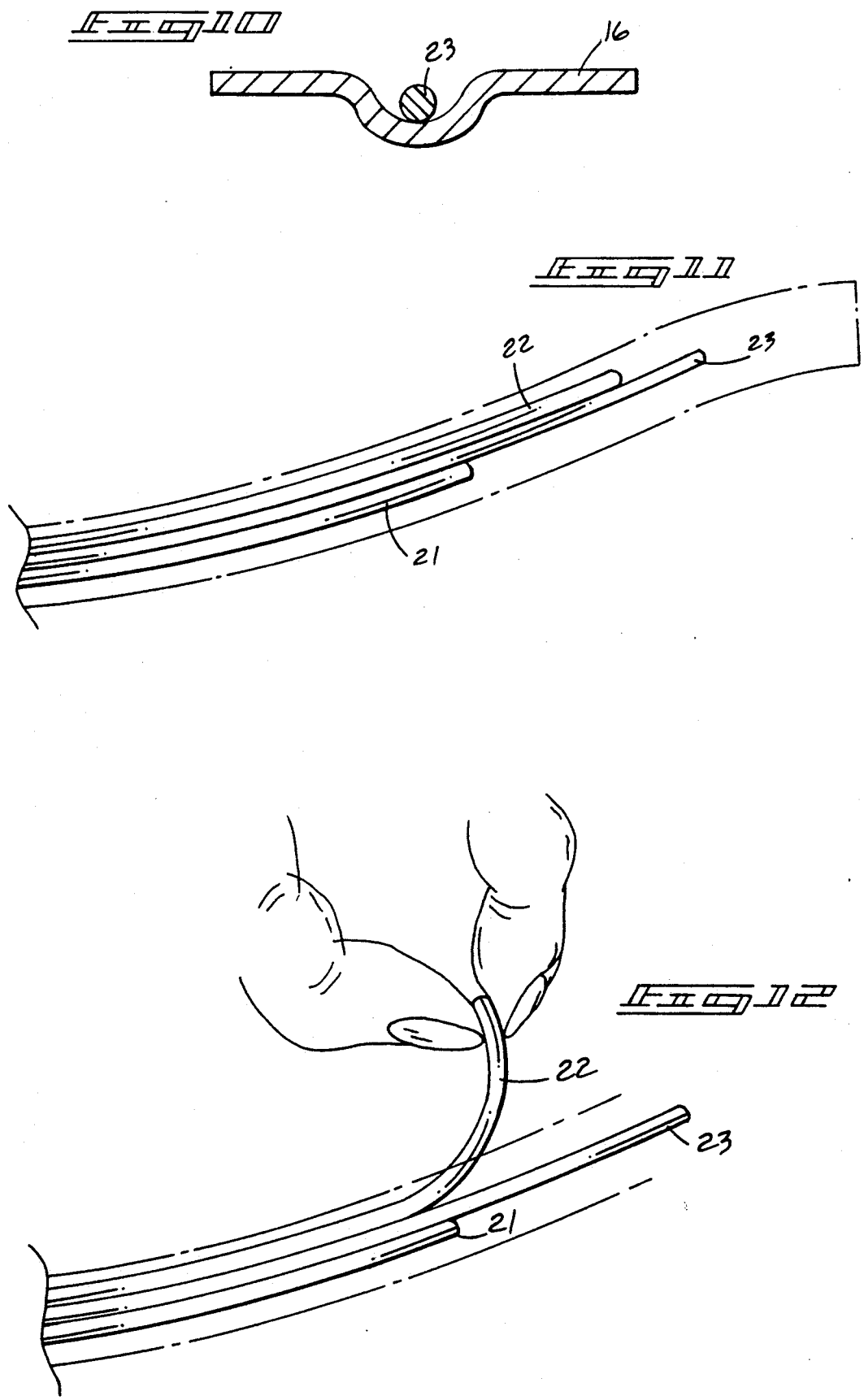

FISHING LURE

BACKGROUND OF THE INVENTION

1. Field of the Invention

The field of invention relates to fishing lures, and more particularly pertains to a new and improved fishing lure wherein the same is arranged for providing multi-colored tinsel strands directed in a surrounding relationship relative to a central shank of the organization for masking the hook member and enhancing the attraction of fish to the hook member during a fishing procedure.

2. Description of the Prior Art

In fishing procedures, and particularly in the attracting of various sporting fish such as crappie, walleye, and bass and the like, various attractants are utilized to enhance attracting of such sporting fish to an associated hook member. Apparatus of the prior art is exemplified in U.S. Pat. No. 4,751,789 to Devereaux, et al. wherein a fishing lure includes a plurality of strands directed downwardly about the fishing shank and hook for masking the hook.

Further, U.S. Pat. No. 4,735,012 to Smith, et al. sets forth a fishing lure utilizing a spoon body, with various strand or filament members directed downwardly relative to the spoon member to overlie a hook portion of the lure.

U.S. Pat. No. 4,799,329 to Paulsen utilizes a central shank with various filament members directed downwardly about the shank extending a distance less than that of an associated hook.

As such, it may be appreciated that there continues to be a need for new and improved fishing lure as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of fishing lures now present in the prior art, the present invention provides a fishing lure wherein the same utilizes a central shank utilizing filaments of various colorations to enhance attraction to a fish to an associated hook of the lure apparatus during a fishing procedure. As such, the general purpose of the present invention, which will be described subsequently in greater detail, is to provide a new and improved fishing lure which has all the advantages of the prior art fishing lures and none of the disadvantages.

To attain this, the present invention provides a fishing lure including a central shank with a hook member mounted at a lower terminal end of the shank and a support head at an upper terminal end of the shank, with a projection mounted to the support head, including an aperture for receiving fishing line therethrough. The organization includes a plurality of tinsel strands mounted in surrounding relationship about the central shank adjacent the support head extending in a surrounding relationship about the central shank and hook member to effect masking of the hook member. A modification of the invention includes a securement strand secured to a supporting web mounting the tinsel strands thereon for enhanced securement of the supporting web about the support shank. A plurality of such securement strands may be provided for projecting orthogonally relative to the support shank to enhance movement of the lure during a fishing procedure. A further modification of the support strands may further include a plurality of weighted wire members of varying lengths mounted upon the support strands and removably and adherably mounted upon at least one of the strands to permit selective modification of gyration of the lure when used in a fishing procedure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fishing lure which has all the advantages of the prior art fishing lures and none of the disadvantages.

It is another object of the present invention to provide a new and improved fishing lure which may be easily and efficiently manufactured and marketed.

It is a further object of the present invention to provide a new and improved fishing lure which is of a durable and reliable construction.

An even further object of the present invention is to provide a new and improved fishing lure which is susceptible of a low cost of manufacture with regard to both materials and labor, and which accordingly is then susceptible of low prices of sale to the consuming public, thereby making such fishing lures economically available to the buying public.

Still yet another object of the present invention is to provide a new and improved fishing lure which provides in the apparatuses and methods of the prior art some of the advantages thereof, while simultaneously overcoming some of the disadvantages normally associated therewith.

Still another object of the present invention is to provide a new and improved fishing lure wherein the same utilizes various filaments and strands directed about the shank of the fishing lure to enhance attraction to the fishing lure and further utilizes apparatus to modify the action of the fishing lure in a fishing procedure by varying imbalances in the fishing lure in use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic side view of the fishing lure utilized by the instant invention.

FIG. 2 is an orthographic top view of a filament body for use in the lure of the instant invention.

FIG. 7 is an orthographic top view of a modified strand support for mounting about the fishing lure of the instant invention.

FIG. 8 is an orthographic view, taken along the lines 8—8 of FIG. 7 in the direction indicated by the arrows.

FIG. 9 is an orthographic view, taken along the lines 9—9 of FIG. 7 in the direction indicated by the arrows.

FIG. 10 is an orthographic view, taken along the lines 10—10 of FIG. 7 in the direction indicated by the arrows.

FIG. 11 is an enlarged telegraphic view of a tinsel strand utilized by the instant invention.

FIG. 12 is an isometric illustration illustrating the modulation of at least one of the tinsel strands by removal of a weighted wire member mounted on the strand.

DESCRIPTION OF THE PREFERRED EMBODIMENT

Figure 3:
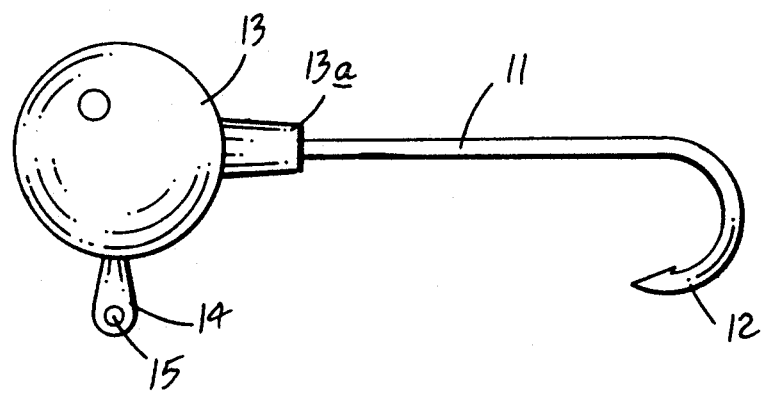
FIG. 3 is an orthographic top view of the fishing lure, including a central shank and hook member mounted thereto.

With reference now to the drawings, and in particular to FIGS. 1 to 12 thereof, a new and improved fishing lure embodying the principles and concepts of the present invention and generally designated by the reference numeral 10 will be described.

More specifically, the fishing lure apparatus 10 of the instant invention essentially comprises a lure including a central rigid shank 11 coaxially aligned terminating at its lower end in a hook member 12. The upper terminal end of the central shank 11 includes a support head 13 mounted thereon, with the support head including a support head shoulder 13a receiving a central shank 11 therewithin and defined by a diameter substantially less than that of a predetermined diameter of the support head 13. Further, the support head 13 includes a projection 14 extending radially and exteriorly of the support head, including a projection aperture 15 directed therethrough, with the aperture 15 receiving a fishing line (not shown) for use of the fishing lure in a fishing event.

Figure 4:
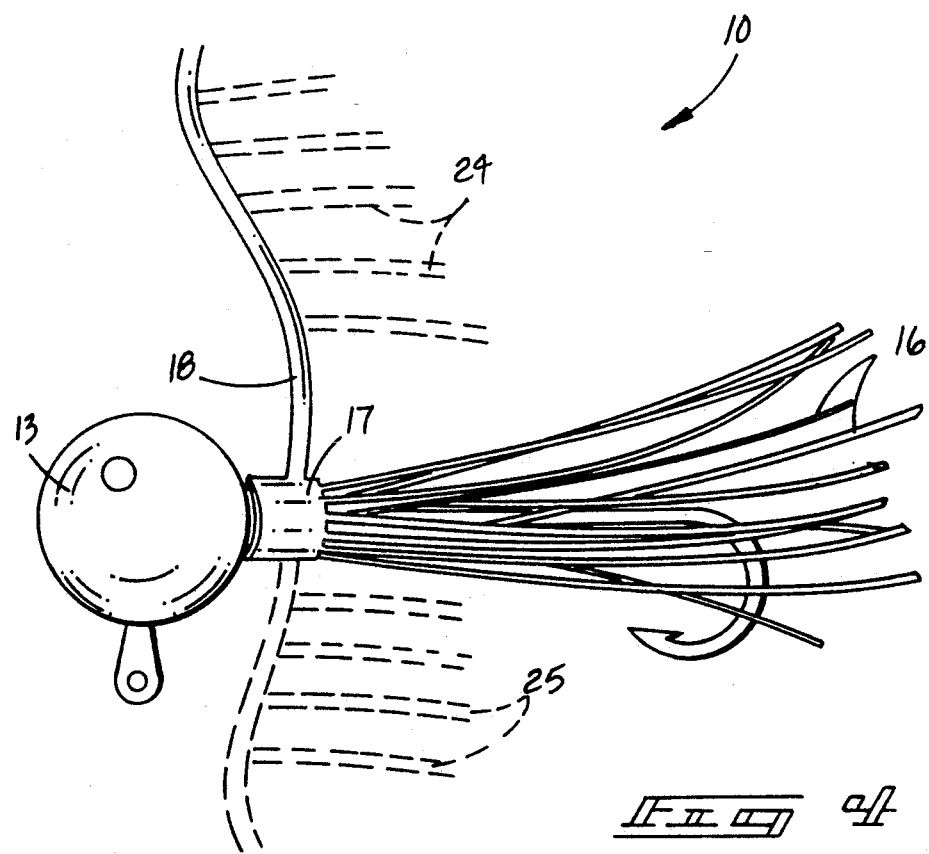
FIG. 4 is an orthographic top view of the fishing lure illustrating a single or plurality of securement strands directed orthogonally and outwardly relative to the central shank to modulate gyration of the lure in use.
Figure 5:
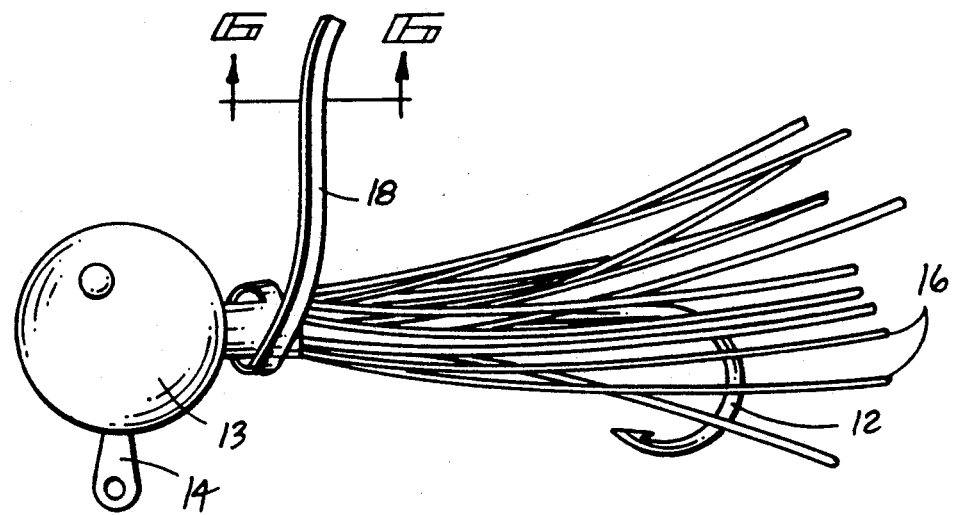
FIG. 5 is an orthographic view of the single securement strand in use with a fishing lure organization.
Figure 6:
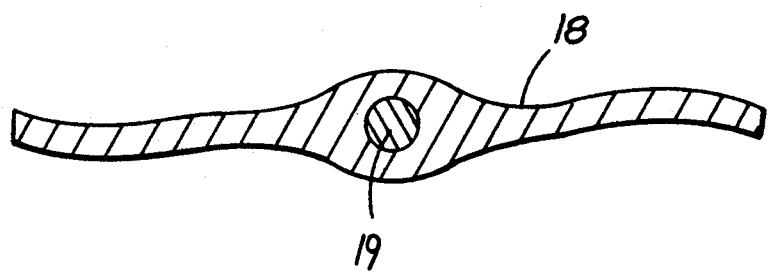
FIG. 6 is an orthographic view, taken along the lines 6—6 of FIG. 5 in the direction indicated by the arrows.

A flexible support web 17 (see FIG. 2) mounts a plurality of tinsel strands 16 coextensively along a lower edge of the support web 17. The strands, as well as the support web, may be formed of various colorations for use as a lure for attracting sporting fish at various times and for attracting various categories of fish by coloration of the tinsel strands 16. A securement strand 18 projects orthogonally of a right side edge of the support web 17, wherein the securement strand 18 includes a securement strand central wire core 19 (see FIG. 6) therethrough to permit wrapping of the securement strand 18 about the support web 17, wherein the support web is wound about the shoulder 13a, such as illustrated in FIG. 5. The securement strand 18 may then be permitted to project exteriorly of the shoulder in a radial or orthogonal relationship relative to the central shank 11, or may be continuously wound about the shoulder 13a to vary gyration of the lure in use. A modified support web 17a is utilized in FIG. 7 and its mounting relative to the shoulder 13a, as illustrated in FIG. 4, wherein the modified securement web 17 includes a second securement strand 20 projecting orthogonally relative to a left side edge of the modified web 17a in combination with the first securement strand 18 projecting orthogonally relative to the right side edge thereof. The first and second securement strands 18 and 20 are also provided with respective first and second securement strand filaments 24 and 25 that are directed downwardly and orthogonally relative to the securement strands to enhance attraction to the lure. It should be further noted that the tinsel strands 16 are defined by a predetermined length greater than a fixed length of the central shank 11 and its associated hook member 12 to extend therebelow to camouflage the hook member and central shank in use.

A modification of the invention permits at least one of the central strands 16 to include a plurality of weighted wire members defined by wire members 21, 22, and 23 set forth as protective first, second, and third weighted wire members, each of a varying length such that the first wire member 21 is of a first length, the second wire member is of a second length greater length the first lenght, and the third wire member 23 is of a third length greater than the second length. The weighted wire members also permit adjustment of gyration of the fishing lure, whereupon removal of selective ones of the wire members will adjust the gyration of the lure in use as desired.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fishing lure comprising, a central rigid shank defined by a predetermined shank length, the shank including a lower terminal end mounting a hook member thereon, and the shank including an upper terminal end, with the upper terminal end mounting a support head thereon, the support head including a shoulder, the shoulder receiving the upper terminal end of the support shank therewithin, and the shoulder defined by a shoulder diameter less than the support head diameter defined by the support head, and a flexible support web wound about the shoulder, and the support web including a support web lower terminal edge, the support web lower terminal edge including a plurality of tinsel strands orthogonally and fixedly mounted coextensively of the support web lower terminal edge, the tinsel strands extend beyond the hook member, and wherein the support web includes a right side edge and a left side edge, the right side edge including a first securement strand projecting orthogonally and exteriorly of the right side edge, wherein the securement strand includes a central wire core positioned within a flexible web permitting manipulation of the first securement strand about the flexible support web when the flexible support web is wound about the shoulder.

2. A fishing lure as set forth in claim 1 including a second securement strand mounted integrally to and positioned orthogonally relative to the left side edge of the support web, wherein the second securement strand includes a securement strand central wire core permitting the second securement strand to be wound about the flexible support web or projected exteriorly thereof adjusting gyration of the fishing lure in use.

3. A fishing lure as set forth in claim 2 wherein at least one of the tinsel strands includes a central concave cavity, the concave cavity mounting a plurality of selectively removable weighted wire members therewithin.

4. A fishing lure as set forth in claim 3 wherein the weighted wire members include a respective first, second, and third weighted wire member, wherein the first weighted wire members are of a first length, the second weighted wire members of a second length, and the third weighted wire members of a third length, wherein the first length is less than the second length and the second length is less than the third length, and the third length is less than a strand length defined by the tinsel strand, and the weighted wire members are adapted for selective removal from the tinsel strand for effecting gyration of the fishing lure in use.

* * * * *